(12) United States Patent
Baba

(10) Patent No.: US 6,190,593 B1
(45) Date of Patent: Feb. 20, 2001

(54) METHOD FOR MANUFACTURING A FALSE NAIL CHIP

(76) Inventor: Satoru Baba, 23-101, Hagoromo-cho 4-chome, Nishinomiya-shi, Hyogo-ken, 662-0051 (JP)

(*) Notice: Under 35 U.S.C. 154(b), the term of this patent shall be extended for 0 days.

(21) Appl. No.: 09/501,721

(22) Filed: Feb. 10, 2000

(30) Foreign Application Priority Data

Feb. 15, 1999 (JP) .................................................. 11-036328

(51) Int. Cl.[7] .................................................. B29C 33/38
(52) U.S. Cl. ........................... 264/162; 264/222; 264/338
(58) Field of Search ..................... 264/222, 138, 264/338, 162

(56) References Cited

U.S. PATENT DOCUMENTS

| | | | |
|---|---|---|---|
| 2,313,807 | * 3/1943 | Curry | 264/222 |
| 2,473,723 | * 6/1949 | Nelson | 264/222 |
| 2,508,156 | * 5/1950 | Gillman | 264/222 |
| 3,037,514 | * 6/1962 | Lappe | 264/222 |
| 4,260,574 | * 4/1981 | Macomson | 264/222 |
| 4,661,187 | * 4/1987 | Beasley | 264/222 |
| 4,718,957 | * 1/1988 | Sensenbrenner | 264/222 |
| 5,662,942 | * 9/1997 | Kim, II | 264/222 |
| 5,968,302 | * 10/1999 | Gifford | 264/222 |

FOREIGN PATENT DOCUMENTS

H07-73532  8/1995  (JP) .

* cited by examiner

Primary Examiner—Allan R. Kuhns (74) Attorney, Agent, or Firm—Armstrong, Westerman, Hattori, McLeland, & Naughton (57) ABSTRACT

A method for manufacturing a false nail chip (1), the method comprising: building an impression material (21) on a tray (20) having a size for holding a fingertip shape; pressing a fingertip (4) including a nail (6) portion against the impression material to take a precise impression of the nail portion; injecting ground plaster mud (38) into the precise impression of the nail portion taken and forming a fingertip plaster model (33) for a false nail chip including a nail portion comprising a nail plate (9), a nailtip and a nail plate margin (10) by hardening; shaving the precise impression at the extreme end from the nailtip of the fingertip plaster model to form an enlarged cavity (28); injecting the plaster mud into the enlarged cavity to integrally add a plaster coarse pattern (30) of a nailtip extending portion to the fingertip plaster model to form a false plaster coarse pattern; removing the false nail plaster coarse pattern from the precise impression; adjusting the nail chip shape of the nail chip side plaster coarse pattern to the nail shape of the nail plate side plaster model to register a nail width and a nail curve degree by hand shaving and determining a nailtip length to finish into a fingertip plaster model (33) for a false nail chip; after a resin parting material has been coated on the nail portion of the finished plaster model for a false nail chip, applying a room temperature polymerization resin (35) to a thickness of a false nail to adjust into a false nail shape, after which it is held at a hardening temperature of room temperature polymerization resin for polymerization hardening to form a resin hardened false nail chip; removing the resin hardened nail chip from the fingertip plaster model for a false nail chip; and shaping and finishing the surface and the extreme end of the resin hardened false nail chip.

3 Claims, 6 Drawing Sheets

METHOD FOR MANUFACTURING A FALSE NAIL CHIP

BACKGROUND OF THE INVENTION

1. Field of the Invention

The present invention relates to a false nail for nail art which is mounted, by a woman, on the finger's nail for smartness or fashion.

2. Related Art

A clean nail of a human being is beautiful in itself. However, nail care has been taken since the age of ancient Egypt, and in modern ages, a neatly cared beautiful fingertip is representative of woman's charm and widely recognized. Not only the nail itself is beautiful, but also nail coloring for applying color to the nail is carried out. Further, not only a monochrome is applied, but also the nail art for depicting a pattern designed with a small flower pattern is carried out. However, when the nail art is once applied to the woman's nail, the same design remains attached to the nail unless the pattern is peeled off, thus posing a problem that applying the nail art being suitable for woman's total fashion requires time and trouble. Further, a beautiful nail shape is required, which is however the matter of the body, and there is a problem that the requirement cannot be met immediately. To cope with such a problem as noted above, a false nail pasted on the nail is devised, and nail art is applied to the false nail to thereby enable the provision of nail art simply. In view of this, a ready-made false nail capable of being pasted simply is sold as a replacing chip.

However, such a replacing chip as described is an existing ready-made false nail chip, while a nail of a finger of a human being is different in a width of a nail plate, a curve of a nail plate and a shape of a nail plate margin according to respective fingers, and therefore, the existing ready-made false nail chip is not always fitted exactly to the curved state of a user's nail plate, thus posing a problem that the false nail chip is loosened and peeled off easily, or the shape of the margin is not fitted, posing a problem that such a false nail chip as described is understood to be a false nail apparently.

In view of the above, the existing false nail chip is forcibly matched to the curve of the nail to be pasted, and the rear end of the false nail chip is matched to the portion of the cuticle when the nail is grown, which are pasted together by a powerful an adhesive. Even if they are pasted with much trouble, when the nail grows, the rear end of the false nail chip is parted from the cuticle, being unsightly. So, it is desired that the false nail chip be peeled off and repasted. However, since the false nail chip is pasted powerfully as described above, the false nail chip gets scratched at various parts when peeling off, failing to use again, thus posing a problem that a new false nail chip be pasted.

In order to solve the problems encountered in the existing ready-made false nail chip, there is proposed to individually manufacture, every nail of respective fingers, false nail chips fitted to the shapes thereof. For example, there is proposed a method for manufacturing an artificial nail disclosed in Japanese Kokoku Patent Publication H07-73532(1995). However, this method comprises: after a plaster model as the first model has been prepared from a precise impression of a fingertip portion including a nail and its peripheral portion, providing an extended bed at the end thereof to serve as a master model, taking again an impression from the master model, preparing again a second model by plaster from the impression, manufacturing a desired shaped artificial nail pattern on a nail portion of the second model, taking an impression pattern for the artificial nail model from the artificial nail pattern, and forming an artificial nail being consisted of the hardening resin in a gap between the impression pattern and a nail portion of the second model from which the artificial nail model is removed, posing a problem that the processes for preparing the second model are complicated and take time and labor.

The present invention is to solve the problem of the existing ready-made false nail chip as noted above, and provides a method for manufacturing precise false nail chips reducing time and labor imposed on the manufacturing of false nail chips adjusted to shapes of respective nails of individual persons, and further provides an arrangement wherein there is provided a false nail chip which can be used for a long period of time such that a pasted false nail can be easily peeled off and the removed false nail can be pasted again as necessary; where a nail grows to part from a cuticle, the parting from the cuticle can be corrected by re-pasting; and various false nails can be easily replaced and pasted while adjusting to visiting destinations or atmospheres encountered.

SUMMARY OF THE INVENTION

For solving the problem as noted above, according to a first aspect of the present invention, there is provided a method for manufacturing a false nail chip, the method comprising: building an impression material on a tray having a size for holding a fingertip shape; pressing a fingertip including a nail portion against the impression material to take a precise impression of the nail portion; injecting ground plaster mud into the precise impression of the nail portion taken and forming a fingertip plaster model including a nail portion comprising a nail plate, a nailtip and a nail plate margin by hardening; shaving the precise impression at the extreme end from the nailtip of the fingertip plaster model to form an enlarged cavity; injecting the plaster mud into the enlarged cavity to integrally add a plaster coarse pattern of a nailtip extending portion to the fingertip plaster model to form a false nail plaster coarse pattern; removing the false nail plaster coarse pattern from the precise impression; adjusting the nail chip shape of the nail chip side plaster coarse pattern to the nail shape of the nail plate side plaster model to register a nail width and a nail curve degree by hand shaving and determining a nailtip length to finish into a fingertip plaster model for a false nail chip; after a resin parting material has been coated on the nail portion of the finished plaster model for a false nail chip, applying a room temperature polymerization resin to a thickness of a false nail to adjust into a false nail shape, after which it is held at a hardening temperature of room temperature polymerization resin for polymerization hardening to form a resin hardened false nail chip; removing the resin hardened false nail chip from the fingertip plaster model for a false nail chip; and shaping and finishing the surface and the extreme end of the resin hardened false nail chip. For the room temperature polymerization resin, for example, acrylic resin for a false tooth or a dental (tooth) plate is used.

According to a second aspect (depending on the first aspect), there is provided a method for manufacturing a false nail chip, the method comprising: after a false nail plaster coarse pattern has been finished to a fingertip plaster model for a false nail chip, placing a wax having a thickness corresponding to a thickness and a size of a false nail chip on the nail portion of the fingertip plaster model and lightly pressing down into a false nail chip wax original mold; embedding the fingertip plaster model for a false nail chip having the false nail chip wax original mold into plaster mud of a flask lower ring having the plaster mud with the false nail chip wax original mold exposed; after the plaster mud has been hardened, coating a releasing agent on the hardened plaster, after which, placing a flask upper ring thereon, and injecting the ground plaster mud into the flask upper ring and embedding the false nail chip wax original mold on the fingertip plaster model for a false nail chip into the plaster mud; after the plaster mud has been hardened, heating the flask to melt and remove the wax to form a cavity of the size of a false nail chip; opening the flask, filling the cavity with a heat curing polymerization resin, after which, placing the flask upper ring thereon, closing the flask upper ring and heating the flask to harden resin; forming a resin hardened false nail chip by heat curing polymerization; removing the resin hardened false nail chip from the plaster pattern; and shaping and finishing the surface and the extreme end thereof.

For the heat curing polymerization resin, for example, acrylic resin for a false tooth or a dental (tooth) plate of the heat curing polymerization type is used.

According to a third aspect (depending on the first aspect), there is provided a method for manufacturing a false nail chip, the method comprising: after a false nail plaster coarse pattern has been finished to a fingertip plaster model for a false nail chip, placing a wax having a thickness corresponding to a thickness and a size of a false nail chip on the nail portion of the fingertip plaster model and lightly pressing down into a false nail chip wax original mold; mounting a wax pattern for forming an injecting hole and an exhaust hole on the false nail chip wax mold to serve as a lower pattern; coating a releasing agent on plaster of the lower pattern comprising the fingertip plaster model for a false nail chip having the false nail chip wax original mold, after which, covering the false chip wax original mold and the wax pattern for forming the injecting hole and the exhaust hole with an upper pattern forming agent such as ground plaster mud or putty-like silicon resin to embed them; after hardening of the upper pattern forming agent, melting and removing the wax by heating to form a false nail chip forming pattern comprising a lower pattern and an upper pattern having a false nail chip cavity and an injecting hole and an exhaust hole; injecting a room temperature polymerization resin of an injecting type into the false nail chip cavity from the injecting hole of the false nail chip forming pattern, after which maintaining at a hardening temperature of the room temperature polymerization resin and subjecting to polymerization hardening to form into a resin hardened nail chip; and removing the resin hardened false nail chip from the false nail chip forming pattern to shape and finish the surface and the extreme end thereof. For the room temperature polymerization resin of the injection type, for example, acrylic resin for a false tooth or a dental (tooth) plate is used, similar to the above-described first aspect.

As described above, the false nail chip manufactured in accordance with the invention has a shape of a nail plate margin of individual nails, a width of a nail plate, and a shape matched to the curve surface of a nail plate, and comprises a body portion capable of closely contacting the nail plate and a nailtip portion extending a predetermined length of a false nail chip from a parting or free edge of the nail to the end integrally continuous from the body portion, a thickness of the false nail chip being a thickness of a nail of the living body, and a double-faced pasting tape is detachably pasted to the back of the false nail chip.

The inventions according to the first to third aspect (claims 1 to 3) relate to a method for manufacturing a false nail chip . The invention according to the first aspect (claim 1) relates to a method comprising, immediately when a fingertip plaster model for a false nail chip is formed, polymerizing and hardening the false nail chip comprising a room temperature polymerization resin on the nail portion, which comprises manufacturing of a false nail chip only for that time. On the other hand, the invention according to the aspects 2 and 3 relate to a method, comprising: when a fingertip plaster model for a false nail chip is formed, forming a false nail chip wax original mold on the nail portion, providing a plaster pattern of a silicon resin pattern which is an upper pattern thereon, heating the wax to melt and remove it, forming a cavity having a false nail shape on the plaster pattern or the silicon resin pattern by lost wax for forming a forming pattern, and forming a false nail chip comprising a heat curing polymerization resin or a room temperature polymerization resin by polymerizing and hardening. Accordingly, if the forming pattern having the cavity is preserved, the same false nail chips can be repetitively manufactured, and where the false nail chip gets scratched, it can be easily manufactured.

PREFERRED EMBODIMENTS OF THE PRESENT INVENTION

Preferred embodiments of the present invention will be described hereinafter with reference to the drawings.

Figure 1:
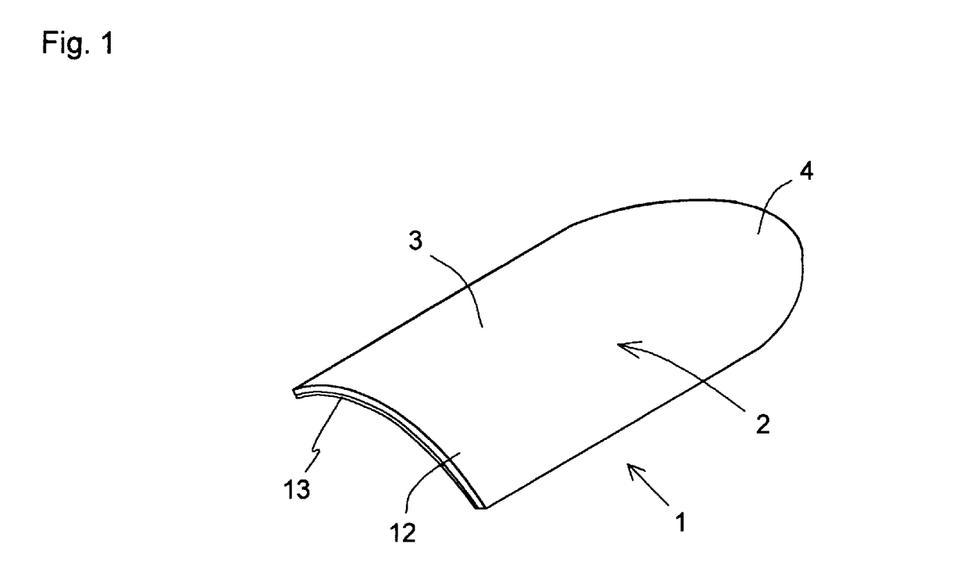
FIG. 1 is a perspective view showing a false nail chip according to the present invention.
Figure 2:
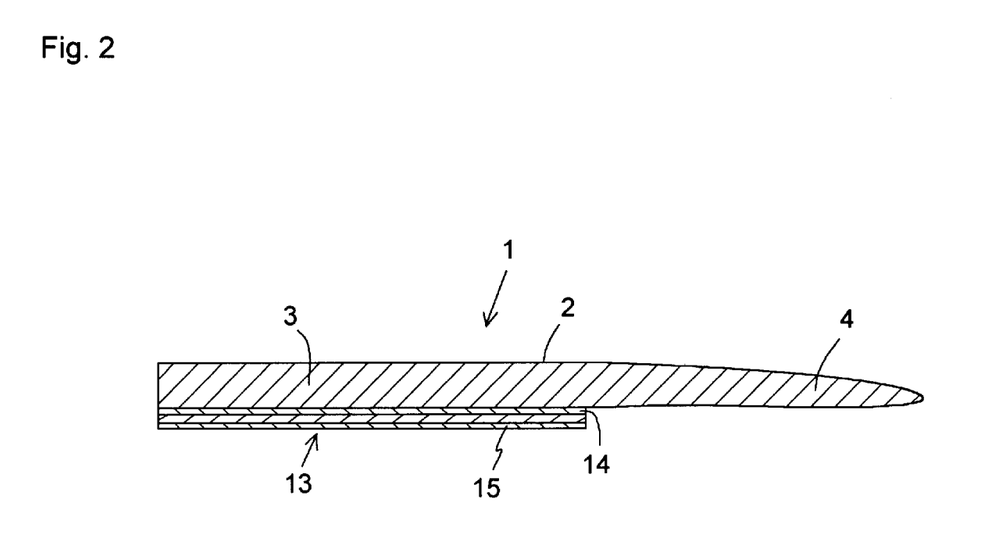
FIG. 2 is a sectional view of the false nail chip according to the present invention.
Figure 3:
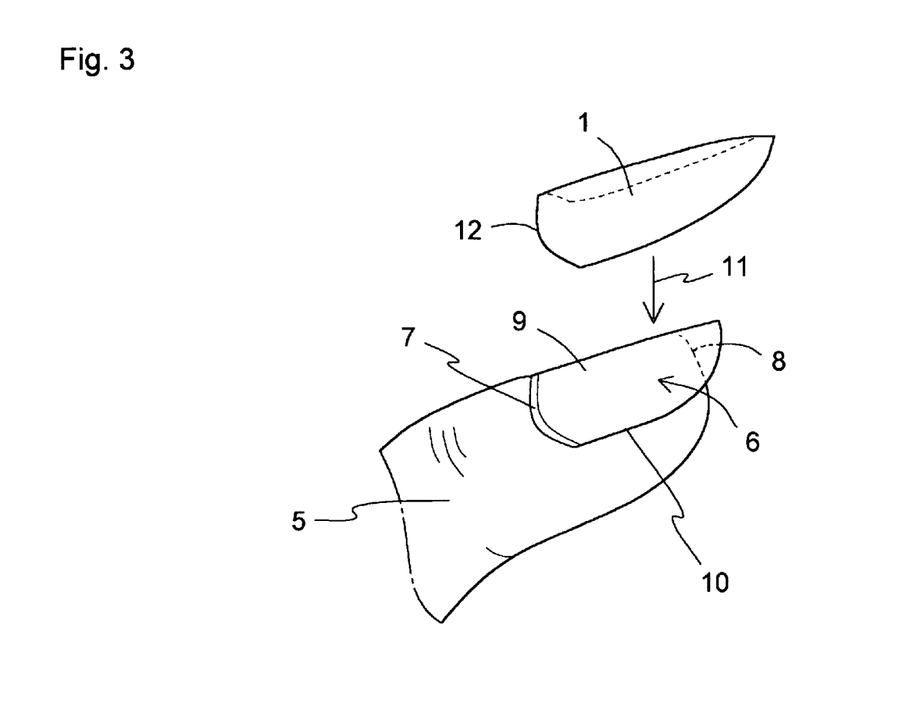
FIG. 3 is a perspective view explaining the mounting state of the false nail chip according to the present invention.
Figure 4:
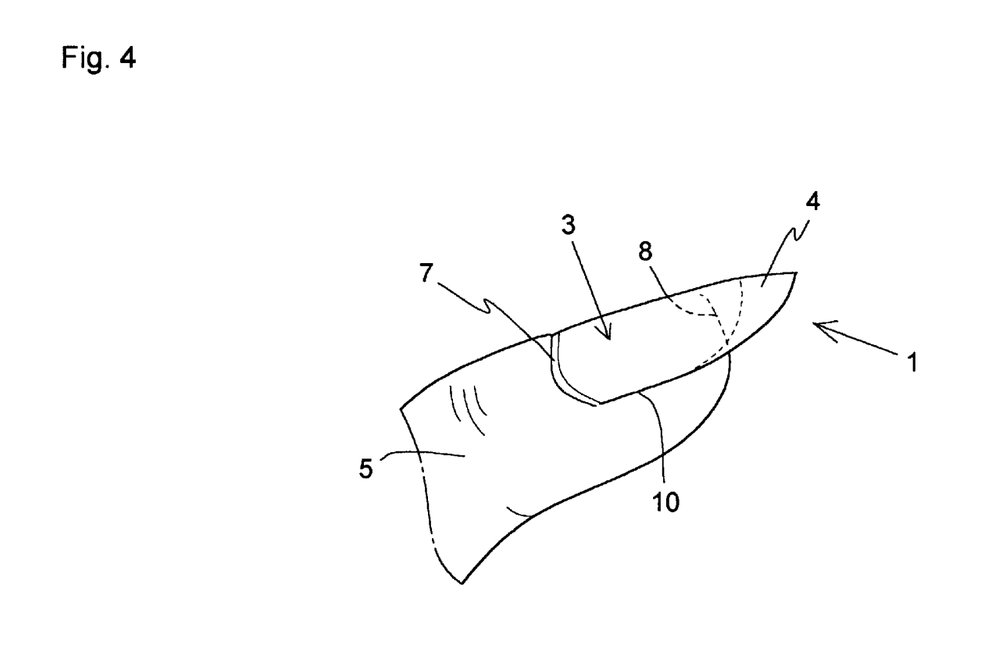
FIG. 4 is a perspective view showing the mounting state of the false nail chip according to the present invention.

FIG. 1 is a perspective view showing a false nail chip (1) according to the present invention. In the drawing, reference numeral (2) denotes a resin hardening false nail chip, which comprises a body portion (3) and a nail chip portion (4), a rear end of the body portion (3) constitutes a rear end portion (12), and a double-faced pasting tape (13) is applied to the back of the false nail chip (1). FIG. 2 is a sectional view of the false nail chip (1) according to the present invention. A double-faced pasting tape (13) is pasted by a pasting agent (14) on the back side on the side of the body portion (3) of the resin hardening false nail chip (2). The other surface of the double-faced pasting tape (13) has a pasting agent (15) to be pasted on a nail plate (9) of a finger (5) shown in FIG. 3. A peeling sheet of paper for protecting the pasting agent surface before use is applied to a pasting agent (15) though not shown. FIG. 3 is a perspective view showing the nail (6) and the false nail chip (1) immediately before mounting on the nail (6) of the finger of a human being. The nail (6) of a human being comprises a cuticle (7) when a nail is grown, a nail plate (9) on the upper surface of the nail (6), left and right nail plate margins (10), and a separating edge (8) at a portion of a boundary between the tip portion of the finger (5) and the nail (6). In the false nail chip (1), the double-faced pasting tape (13) pasted on the back of the nail chip (1) is applied to the nail plate (9) in a direction indicated by arrow (11). FIG. 4 is a perspective view in which the nail chip (1) is applied to the nail (6) of the finger (5). As can be seen from the drawing, the tip side of the nail chip (1) from the separating edge (8) is called a nailtip portion (4), and the rear end side from the separating edge (8) is called a body portion (3).

Figure 5:
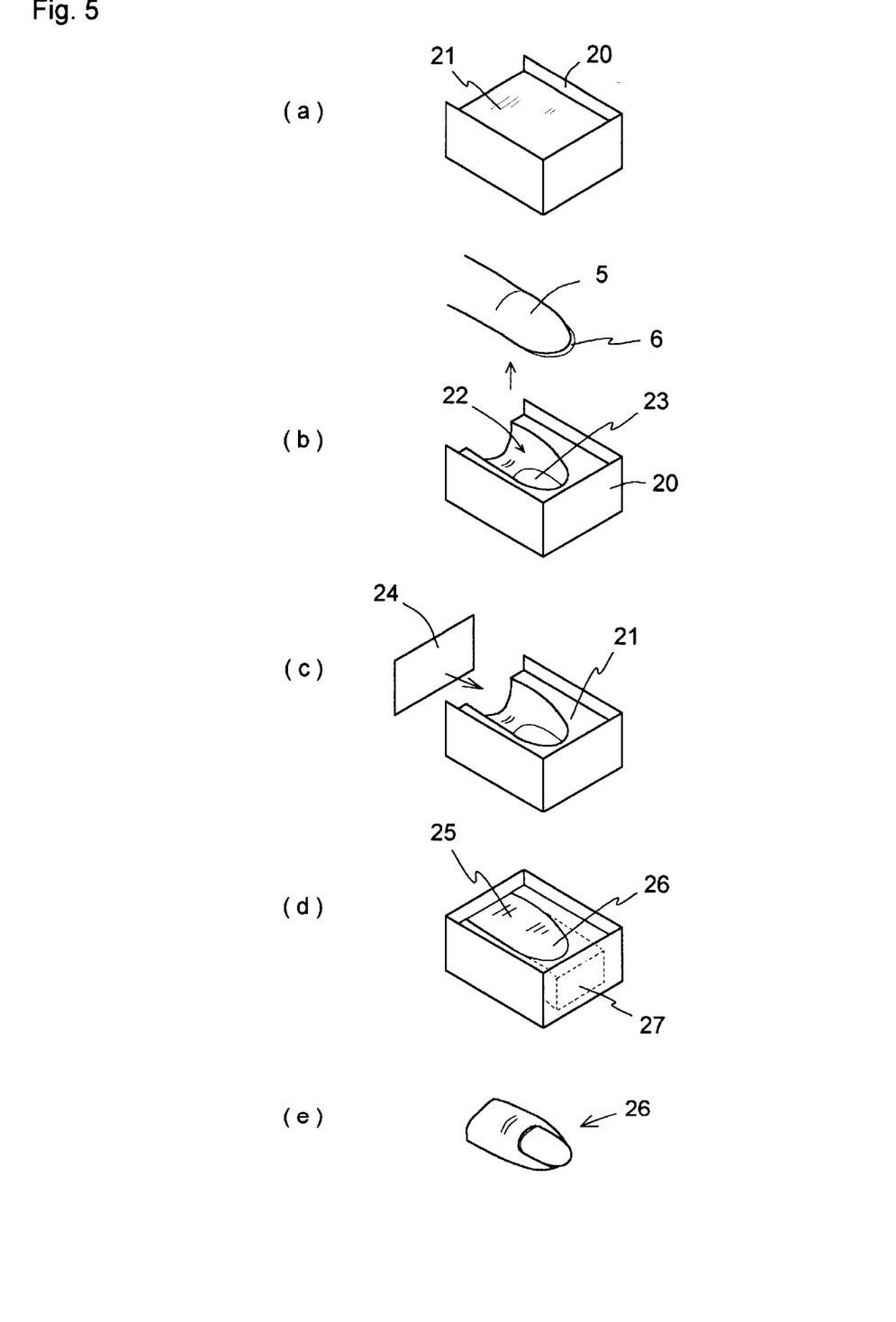
FIG. 5 is a view showing the process of manufacturing the false nail chip according to the present invention.
Figure 6:
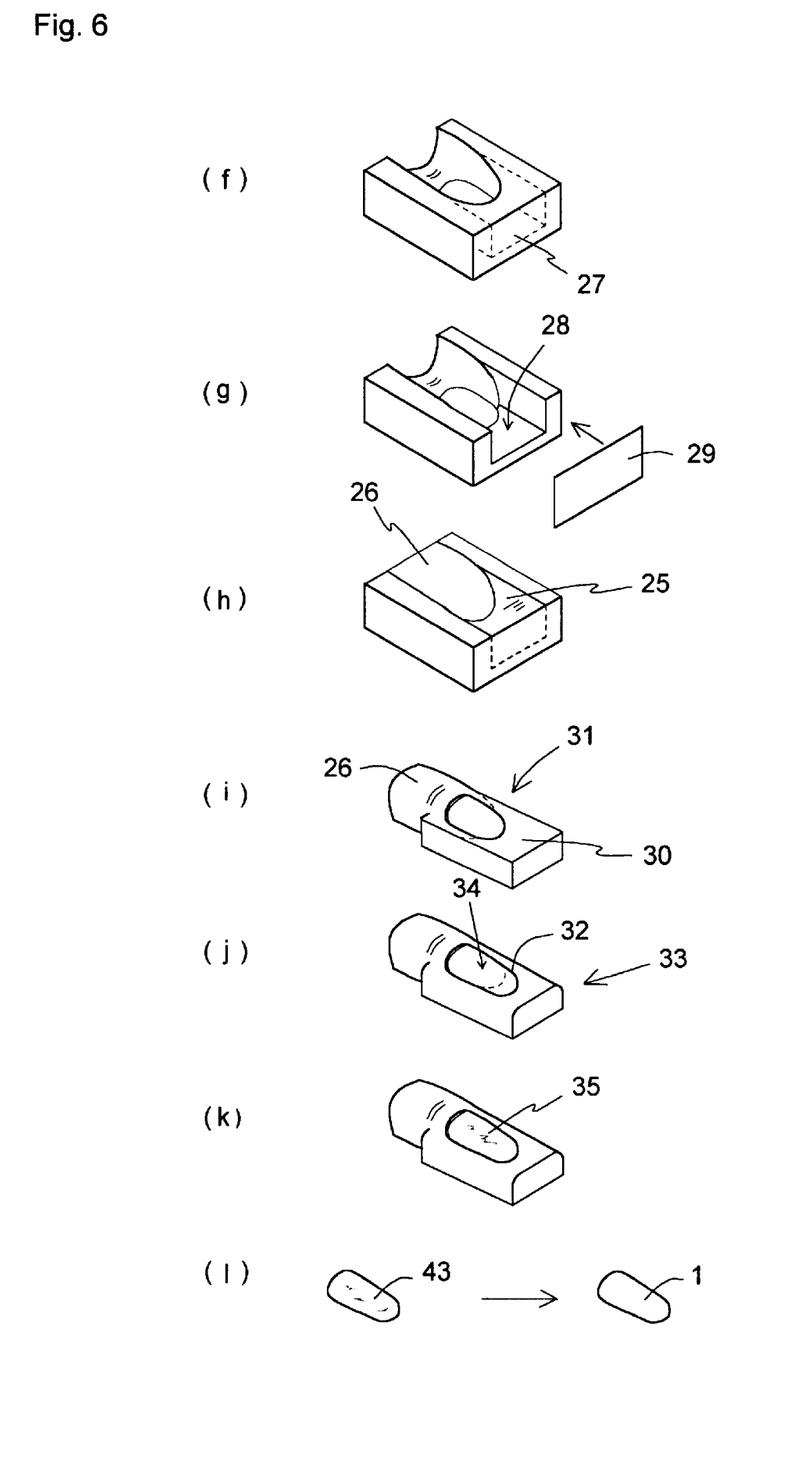
FIG. 6 is a view showing the process of manufacturing the false nail chip according to the present invention continuous to FIG. 5.
Figure 7:
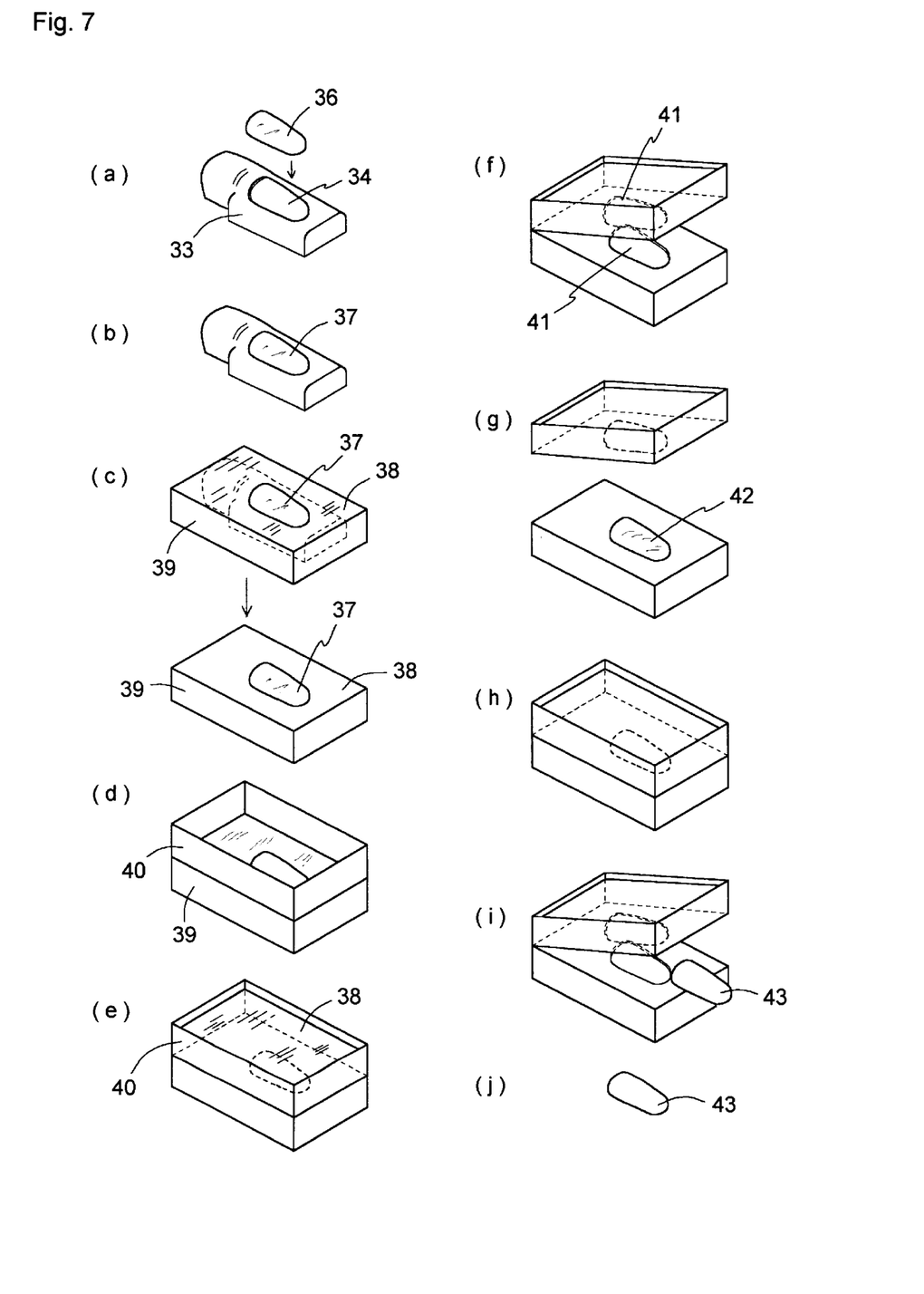
FIG. 7 is a view showing the process of manufacturing the false nail chip according to another embodiment.

In the following, a method for manufacturing a false nail chip (1) will be described with reference to FIGS. 5 to 7. First, a description will be made in accordance with the processes in (a) to (l) shown in FIGS. 5 and 6. (a): There is prepared a tray (20) having the size capable of accommodating a fingertip shape of a finger (5) having a nail (6) on which is pasted a false nail chip (1) to be manufactured, and an impression material (21) for taking a precise impression of the nail (6) and a portion of the fingertip portion in the periphery of the nail is built on the tray (20). For example, a mixture of a silicon rubber base and a hardening agent as the impression material (21) is built on the tray (20). (b): The nail (6) of the finger (5) for taking an impression and the peripheral portion of the nail are pressed into contact with the soft impression material 20 built, and after the impression material (21) has been hardened, the finger (5) is pulled out of the impression material (21). A cavity portion (22) of the impression material (21) from which the finger (5) is pulled out is formed with a nail portion precise impression (23) including the periphery of the nail. (c): A finger hole trace of the side wall opposite to the nailtip side of the cavity portion (22) formed is covered with a cover plate (24). (d): Then, a plaster releasing agent is applied to the cavity portion (22) covered with the cover plate (24), after which ground plaster mud (25) is injected there into. (e): After hardening, there is formed a fingertip plaster model (26) including a nail portion comprising a nail plate, a nailtip and a nail plate margin. (f): Further, the fingertip plaster model (26) is taken out of the impression material (21), and the precise impression (27) on the nailtip extreme end side of the fingertip plaster model (26) is shaved off, (g) to form an enlarged cavity (28). Then, the end of the enlarged cavity (28) is covered with a cover plate (29). (h): After the end has been covered with the cover plate (29), the fingertip plaster model (26) is returned to an original position of the impression material (21), the plaster mud (25) is injected into the enlarged cavity (28), and a nailtip extension portion plaster coarse pattern (30) is added to the fingertip plaster model (26) integrally, (i) to form a false nail plaster coarse pattern (31). The false nail plaster coarse pattern (31) is taken out of the impression material (21), and the plaster added on the nailtip side of the false nail plate coarse pattern (31) is shaved by hand; (j): a nail width and a degree of longitudinal and lateral nail curves are registered adjusting to the nail shape on the nail plate side of the fingertip plaster model (26), a nail plate margin (32) is provided, a length of the nailtip is determined from a length of a fixed false nail, and a shape of a nail portion (34) of a nailtip continuous to a shape of a finger portion of the fingertip plaster model (26) is carved out to finish it to a fingertip plaster model (33) for a false nail chip.

(k): After the resin separating agent has been coated on the nail portion (34) of the fingertip plaster model (33) for a false nail chip prepared as described above, a room temperature polymerization resin (35) prepared by a mixture of a powder comprising polymethyl methacrylate, benzoyl peroxide and a coloring agent, and a liquid comprising methyl methacrylate, tertiary amine and a cross-linking monomer is spread and coated on the entire nail portion (34) uniformly to a thickness of the false nail chip. Here, care should be taken so as not to be forced out of the nail plate margin (32). (l): After the room temperature polymerization resin (35) coated as described above has been polymerized and hardened at a temperature of about 50° C., a resin hardened false nail is formed on the fingertip plaster model (33) for a false nail chip. The formed resin hardened false nail is removed from the fingertip plaster model (33) for a false nail chip, and the surface and the extreme end portion of the resin hardened false nail are smoothly polished and finished for shaping to obtain a false nail chip (1).

Next, the embodiment of the invention described in claim 2 will be described with reference to FIG. 7. In this case, the processes for finishing the false nail plaster coarse pattern (31) to the fingertip plaster model (33) for a false nail chip are the same as those of (a) to (j) shown in FIG. 5 and 6. Accordingly, after the fingertip plaster model (33) for a false nail chip has been finished by the above-described processes, the processes shown in FIG. 7 include: (a): a wax sheet (36) having a shape corresponding to a thickness and a size of a false nail chip is placed on the nail portion (34) of the fingertip plaster model (33) and lightly pressed down, (b): into a false nail chip wax original mold (37). Then, (c): the fingertip plaster model (33) for a false nail chip on which the false nail chip wax original mold (37) is placed is dipped into plaster mud (38) of a flask lower ring (39) into which the plaster mud (38) is put, and a portion of the false nail chip wax original mold (37) is exposed and embedded. Subsequently, (d): After the plaster mud (38) in the flask lower ring (39) has been hardened, a releasing agent, for example, an alginate parting agent is coated thereon, after which, (d): a flask upper ring (40) is placed thereon, and the ground plaster mud (38) is injected into the flask upper ring (40) from an injecting opening (not shown) of the flask upper ring (40), and (e): the false nail chip wax original mold (37) on the fingertip plaster model (33) for a false nail chip is embedded with the plaster mud (38). (f): After the plaster has been hardened, the flask is heated to melt and remove the false nail chip wax original mold (37). As a result, a cavity (41) having a shape of a false nail chip is formed between the nail portion (34) of the fingertip plaster model (33) for a false nail chip within the flask and the hardened plaster within the flask upper ring (40). Next, (g): The flask upper ring (40) is opened, a resin parting agent is coated within the cavity (41) formed on the nail portion (34) on the fingertip plaster model (33) for a false nail chip of the flask lower ring (39) and adjusted to provide a kneaded heat curing polymerization resin (42), which is filled therein and lightly pressed down and spread over the nail portion (34). It is to be noted that in place of a filling method for filling with lightly pressing down and spreading the heat curing polymerization resin, there can be employed an injection method for spreading and injecting the polymerization rein. (h): After closure, the flask is heated and held at a heat polymerization temperature. The heat polymerization resin (42) charged into the cavity (41) is polymerized and hardened by heating to form a resin hardened false nail chip. (i): The flask is opened to remove the formed resin hardened false nail chip, and the surface and the extreme end of the resin hardened false nail chip are shaped and finished to provide a false nail chip (1).

Figure 8:
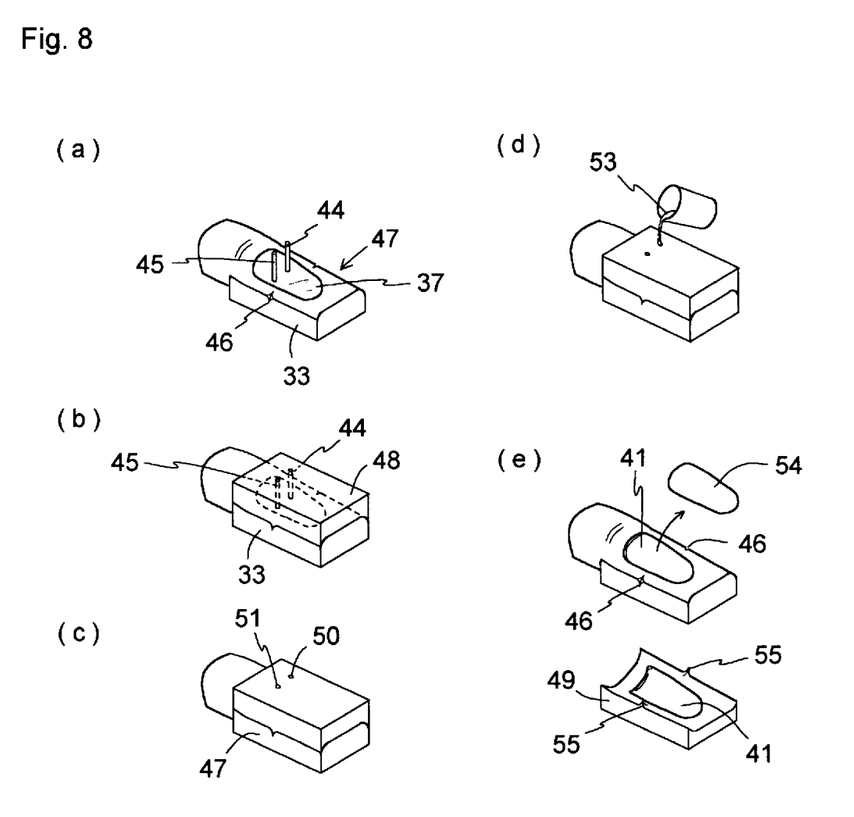
FIG. 8 is a view showing the process of manufacturing the false nail chip according to still another embodiment.

In the following, the embodiment of the invention described in claim 3 will be described with reference to FIG. 8. In this case, the processes for finishing the false nail plaster coarse pattern (31) to the fingertip plaster model (33) for a false nail chip are the same as those of (a) to (j) shown in FIGS. 5 and 6, similar to the embodiment of the invention described in claim 1, and thereafter processes are the same as those of (a) and (b) shown in FIG. 7 in the embodiment of the invention described in claim 2. Accordingly, processes after the false nail chip wax original mold (37) has been finished on the fingertip plaster model (33) for a false nail chip will be described with reference to FIG. 8. The process shown in FIG. 7 includes (a): An injection hole wax pattern (44) and an exhaust hole wax pattern (44) are mounted on the false nail chip wax original mold (37) to constitute a lower pattern (47), a part of ridge lines at left and right side upper ends of the lower pattern (47) is cut to form a cut (46) which serves as a mark of pattern-shaping, after which a releasing agent is applied to the plaster of the lower pattern (47). (b): Then, the false nail chip wax original mold (37), the injection hole wax pattern (44) and the exhaust hole wax pattern (45) are covered with an upper pattern forming agent (48) such as ground plaster mud or putty-like silicone resin. And the extreme ends of the injection hole wax pattern (44) and the exhaust hole wax pattern (44) are projected and embedded. (c): Then, after the upper pattern forming agent (48) has been hardened, the hardened upper pattern (49) and lower pattern (47) are heated to melt and remove the wax embedded in the patterns and to form a false nail chip forming pattern (52) comprising the lower pattern (47) and the upper pattern (49) having a false nail chip cavity (41), an injection hole (50) and an exhaust hole (51) therein. (d): An injection type room temperature polymerization resin liquid (53) is injected and filled into the false nail chip cavity (41) from the injection hole (50) of the false nail chip forming pattern (52). Subsequently, it is polymerized and hardened while holding a polymerization hardening temperature, for example, 50° C., of the room temperature polymerization resin. (e): The upper pattern (49) is removed from the lower pattern (47) to take out the resin hardened false nail chip (54) formed of the nail chip forming pattern (52), and the surface and the extreme end of the resin hardened false nail chip (54) removed are shaped and finished similarly to that described above to form a false nail chip (1). The upper pattern (49) is formed with a projection (55) as a mark for pattern-shaping.

Then, a double-faced pasting tape mounted on the false nail chip (1) prepared as described above is cut off in size slightly smaller than that of the finger's nail, and the surface of the pasting agent (14) of the double-faced pasting tape (13) cut off is pasted on the back of the side of the cuticle (7) of the false nail chip (1) to provide a completed false nail chip (1). In use, a peeling sheet of the back of the cut-off double-faced pasting tape (13) is removed to expose the surface of the pasting agent (15), which is pasted on the nail plate (9) of the nail (6). The false nail chip (1) according to the present invention is applied on the surface thereof with various colors for the purpose of design.

As described above, according to the method of the present invention, it is possible to manufacture a precise false nail chip while reducing time and labor required for manufacturing the false nail chip adjusted to shapes of respective nails of individuals, matching to a shape of nail plate margin, a width of a nail plate, and longitudinal and lateral curved surfaces of a nail plate, and closely coming into contact with a nail plate. Further, a false nail having the false nail chip mounted on the finger's nail can be easily detachably mounted because of use of a double-faced pasting tape; when the peeled off false nail chip is put away, it can be pasted again when necessary to use as a false nail, as a result, being a false nail capable of using for a long period; and when a nail grew long and the edge of a false nail chip came apart from the portion of the cuticle of the nail, the false nail chip can be peeled off and repasted on the right place of the nail for correction. Further, when the false nail chip is broken, or when the shape of a nail plate become changed, repair can be made easily by polymerization resin. Moreover, various false nail chips can be replaced and pasted, while coordinating to visiting destinations or atmospheres encountered. When a nail color variously designed is coated on the surface of a false nail chip, the nail art can be free to provide excellent effects that not present in prior goods.

What is claimed is:

1. A method for manufacturing a false nail chip, the method comprising: building an impression material on a tray having a size for holding a fingertip shape; pressing a fingertip including a nail portion against the impression material to take a precise impression of the nail portion; injecting ground plaster mud into the precise impression of the nail portion taken and forming a fingertip plaster model including a nail portion comprising a nail plate, a nailtip and a nail plate margin by hardening; shaving the precise impression at the extreme end from the nailtip of the fingertip plaster model to form an enlarged cavity; injecting the plaster mud into the enlarged cavity to integrally add a plaster coarse pattern of a nailtip extending portion to the fingertip plaster model to form a false nail plaster coarse pattern; removing the false nail plaster coarse pattern from the precise impression; adjusting the nailtip shape of a nailtip side plaster coarse pattern to the nail shape of a nail plate side plaster model to register a nail width and a nail curve degree by hand shaving and determining a nailtip length to finish into a fingertip plaster model for a false nail chip; after a resin parting material has been coated on the nail portion of the finished plaster model for a false nail chip, applying a room temperature polymerization resin to a thickness of a false nail to adjust into a false nail shape, after which it is held at a hardening temperature of the room temperature polymerization resin for polymerization hardening to form a resin hardened false nail chip; removing the resin hardened nail chip from the fingertip plaster model for a false nail chip; and shaping and finishing the surface and the extreme end of the resin hardened false nail chip.

2. The method for manufacturing a false nail chip according to claim 1, the method comprising: after the false nail plaster coarse pattern has been finished to the fingertip plaster model for a false nail chip, placing a wax having a thickness corresponding to a thickness and a size of a false nail chip on the nail portion of the fingertip plaster model and lightly pressing down into a false nail chip wax original mold; embedding the fingertip plaster model for a false nail chip having the false nail chip wax original mold into plaster mud of a flask lower ring having the plaster mud with the false nail chip wax original mold exposed; after the plaster mud has been hardened, coating a releasing agent on the hardened plaster, after which, placing a flask upper ring thereon, and injecting the ground plaster mud into the flask upper ring and embedding the false nail chip wax original mold on the fingertip plaster model for a false nail chip into the plaster mud; after the plaster mud has been hardened, heating the flask to melt and remove the wax to form a cavity of a false nail chip; opening the flask, filling the cavity with a heat curing polymerization resin, after which, after which, placing the flask upper ring thereon and closing the flask upper ring to heat the flask to harden resin; forming a resin hardened false nail chip by heat curing polymerization; removing the resin hardened false nail chip from the plaster pattern; and shaping and finishing the surface and the extreme end thereof.

3. The method for manufacturing a false nail chip according to claim 1, the method comprising: after the false nail plaster coarse pattern has been finished to the fingertip plaster model for a false nail chip, placing a wax having a thickness corresponding to a thickness and a size of a false nail chip on the nail portion of the fingertip plaster model and lightly pressing down into a false nail chip wax original mold; mounting a wax pattern for forming an injecting hole and an exhaust hole on the false nail chip wax mold to serve as a lower pattern; coating a releasing agent on plaster of the lower pattern comprising the fingertip plaster model for a false nail chip having the false nail chip wax original mold, after which, covering the false nail chip wax original mold and the wax pattern for forming the injecting hole and the exhaust hole with an upper pattern forming agent of either a ground plaster mud or putty-like silicon resin to embed them; after hardening of the upper pattern forming agent, melting and removing the wax by heating to form a false nail chip forming pattern comprising a lower pattern and an upper pattern having a false nail chip cavity and an injecting hole and an exhaust hole; injecting a room temperature polymerization resin of an injecting type into the false nail chip cavity from the injecting hole of the false nail chip forming pattern, after which maintaining at a hardening temperature of the room temperature polymerization resin and subjecting to polymerization hardening to form into a resin harden nail chip; and removing the resin hardened false nail chip from the false nail chip forming pattern to shape and finish the surface and the extreme end thereof.

* * * * *